United States Patent [19]

Yasukawa

[11] 4,385,889
[45] May 31, 1983

[54] APPARATUS FOR PREHEATING MATERIAL FOR MAKING STEEL

[75] Inventor: Shouzo Yasukawa, Kobe, Japan

[73] Assignee: Nikko Industry Co., Ltd., Kobe, Japan

[21] Appl. No.: 294,370

[22] Filed: Aug. 19, 1981

[51] Int. Cl.³ .......................... F27D 17/00; F27B 3/18
[52] U.S. Cl. ........................................ 432/179; 34/86; 373/80; 432/93; 432/162
[58] Field of Search ................. 432/162, 101, 179, 93; 34/86; 373/80

[56] References Cited

U.S. PATENT DOCUMENTS

| 2,826,824 | 3/1958 | Campbell | 34/86 |
| 3,172,648 | 3/1965 | Brichard | 432/101 |
| 3,180,724 | 4/1965 | Brooke | 432/101 |
| 3,379,425 | 4/1968 | Dell'agnese et al. | 432/101 |
| 3,852,028 | 12/1974 | Reinbold et al. | 432/162 |

FOREIGN PATENT DOCUMENTS

45-41490 12/1970 Japan .

Primary Examiner—John J. Camby
Attorney, Agent, or Firm—Koda and Androlia

[57] ABSTRACT

A preheating apparatus for preheating the material, such as scrap, to be charged into steel making equipment with the heat of exhaust gas from the equipment. The apparatus comprises a plurality of preheating units for dischargeably accommodating the charge. The preheating units are connected together in series by ducts to pass the exhaust gas through the units in series and preheat the charge in the units.

9 Claims, 8 Drawing Figures

APPARATUS FOR PREHEATING MATERIAL FOR MAKING STEEL

BACKGROUND OF THE INVENTION

The present invention relates to an apparatus for preheating the material to be charged into steel making equipment.

In steel making processes, it is desirable to preheat materials, such as scrap, alloy iron, directly reduced iron and lime, before they are charged, for example, into electric furnaces.

The steel making material is preheated to avoid a steam explosion accident when it is charged into the furnace for safety operation and to achieve an improved steel making efficiency by promoting melting of the material.

While auxiliary burners are most widely used for preheating the charge, such devices are not favorable for savings in energy. Accordingly apparatus have been introduced into use for recovering heat from the hot exhaust gas released from electric furnaces, at a location between the furnace and a dust collector for forcedly discharging the gas from the furnace. However, these apparatus have the following drawbacks.

Basically the apparatus is as low as, for example, 20 to 30% in heat recovery efficiency and is unable to fully preheat the charge, necessitating a long period of time for steel making operation. Conversely if it is attempted to improve the recovery efficiency, the preheating apparatus must be made large-sized and complex at an increased cost. Thus the apparatus fails to achieve savings in energy as desired. Additionally, the preheating apparatus, if large-sized, requires a prolonged cycle time for supplying the charge to the apparatus and withdrawing the charge therefrom. This will reverse the current trend of steel making techniques toward a shorter melting time, hence objectionable.

Furthermore the conventional preheating apparatus, which must fulfill the requirement of shortening the cycle time, is nevertheless cumbersome to operate, while the apparatus still remains to be improved in ensuring safety of operation.

The conventional preheating apparatus has another problem. Because of the low heat recovery efficiency, the gas released from the apparatus to the atmosphere has a relatively high temperature (e.g. 150° C.) and therefore contains a large amount of oil mist, etc. When released to the atmosphere along with the exhaust gas, such mist produces a white smoke to cause air pollution.

SUMMARY OF THE INVENTION

An object of the present invention is to effectively utilize (e.g. about 70%) the heat of exhaust gas from steel making equipment for fully preheating the material to be charged into the equipment to reduce the time needed for melting the material, i.e. for making steel.

Another object of the invention is to provide an apparatus for preheating the charge with a simple and compact construction at a low cost.

Another object of the invention is to make it possible to supply the charge to the preheating apparatus and discharge the charge therefrom with ease and within a short period of time while permitting the apparatus to fully preheat the charge to an extent in conformity with the melting time.

Still another object of the invention is to provide a preheating apparatus by which air pollutants can be removed from the exhaust gas and decomposed to prevent pollution to the greatest possible extent.

DESCRIPTION OF THE PREFERRED EMBODIMENTS

A first embodiment will be described with reference to FIGS. 1 to 5.

Figure 1:
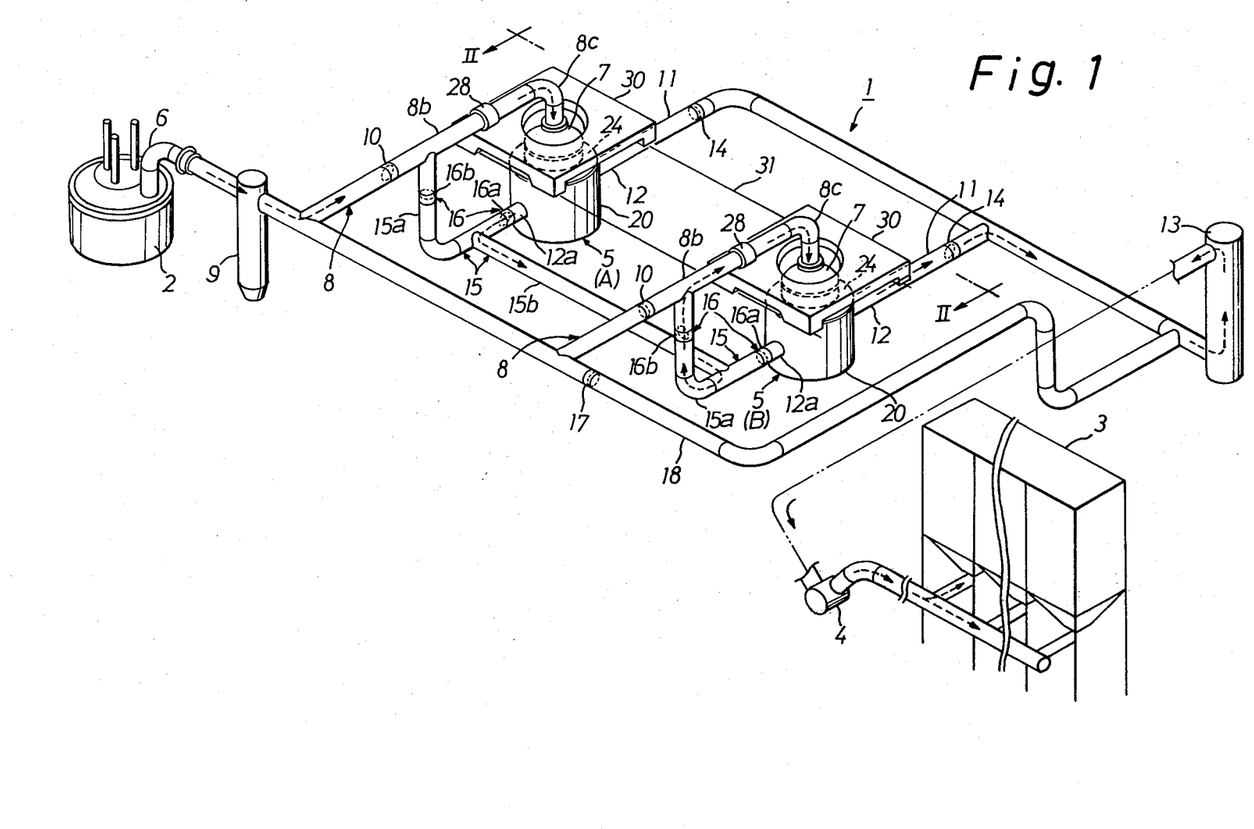
FIG. 1 is an overall perspective view showing an embodiment of the invention.

FIG. 1 shows a preheating apparatus 1 provided between steel making equipment 2, such as an electric furnace, and a baghouse 3 for collecting dust from the exhaust gas discharged from the equipment 2. The apparatus 1 is connected to the equipment 2 and the baghouse 3 by a duct line. The exhaust gas is withdrawn through the line by an exhaust blower 4 provided between the apparatus 1 and the baghouse 3.

Materials for the equipment 2, such as scrap, alloy iron, directly reduced iron and lime, are preheated by the apparatus 1 with the heat of the exhaust gas from the equipment 2. The apparatus includes a plurality of preheating units 5, e.g. two preheating units as shown, for withdrawably containing the charge.

An exhaust gas discharge portion 6 of the equipment 2 is connected to gas inlet portions 7 of the preheating units 5 by branched supply ducts 8. In the vicinity of the equipment 2, the supply ducts 8 are connected to a vertical gas distribution tower 9. Between the gas discharge portion 6 and the gas inlet portion 7 of each of the preheating units 5, the supply duct 8 is provided with a first shutoff valve 10 of the butterfly type which is operable electrically or by cylinder means.

Discharge ducts 11 for eventually discharging the exhaust gas passing through the preheating units 5 connect gas outlet portions 12 of the units 5 to a discharge blower 4 and are provided at an intermediate location with a vertical gas confluence tower 13. Each of the discharge ducts 11 has a third shutoff valve 14 of the same type as the first shutoff valve 10.

To cause the exhaust gas to pass through the preheating units 5 in succession in series while flowing from the supply duct 8 to the discharge duct 11, a second gas outlet portion 12a of each unit 5 is connected to the gas inlet portion 7 of the other unit 5 by each of connecting ducts 15. In the illustrated embodiment, the connecting duct 15 extends between the preheating units 5 and is intermediately provided with second shutoff valves 16 of the same type as the first shutoff valve 10. The second outlet portion 12a is in communication with the outlet portion 12 within the preheating unit 5.

The connecting ducts 15 will be described in greater detail. The second outlet portion 12a of each preheating unit 5 is connected by a connecting duct segment 15a to the supply duct 8 at a location between the gas inlet 7 of that unit 5 and the first shutoff valve 10. The duct segment 15a has first and second outlet valves 16a, 16b in series. The portions of the duct segments 15a between the first and second outlet valves 16a, 16b are interconnected by a common duct 15b. The first outlet valve 16a is positioned closer to the unit 5 than the second. One of the preheating units 5 at the left in FIG. 1 is designated at A, and the other unit 5 at the right is indicated at B. One of the connecting ducts 15 interconnecting the units 5 comprises the portion of the duct segment 15a connected to the second outlet portion 12 of the unit A and having the first outlet valve 16a, the common duct 15b, and the portion of the duct segment 15a connected to the supply duct 8 for the unit B and having the second outlet valve 16b. The first and second outlet valves 16a, 16b on this connecting duct 15 serve as the second shutoff valves 16 therefor. Similarly the other connecting duct 15 extends from the second gas outlet portion 12a of the unit B to the supply duct 8 for the unit A.

The valves 10, 14 and 16 are opened or closed so that the exhaust gas will flow through the preheating units 5 in series in succession in an order selectively determined, for example, under an electrical program. The flow of the gas will be described with reference to FIG. 1. When the first shutoff valve 10 and the first outlet valve 16a for the unit A and the second outlet valve 16b and the third shutoff valve 14 are all opened, with the other valves closed, the exhaust gas from the steel making equipment 2 flows through the supply duct 8 into the unit A, passes through the charge therein, then enters the unit B through the connecting duct 15, flows through the interior of the unit B and through the discharge duct 11, and is drawn by the blower 4 into the baghouse 3, in which dust is removed from the gas (see broken-line arrows). The gas is thereafter released to the atmosphere. If the shutoff valves 10, 14 and 16 are opened or closed reversely, the exhaust gas flows through the unit B and then through the unit A in series. During the flow of the gas through the apparatus, portions of the dust in the gas are collected by the gas distribution tower 9 and the gas confluence tower 13 owing to inertia, and the dust settled is withdrawn from the towers 9, 13 as desired.

The present embodiment further includes a direct duct 18 for directly connecting the gas distribution tower 9 to the gas confluence tower 13 by way of a fourth shutoff valve 17, which is usually closed. When the preheating apparatus 1 is not in use, the fourth shutoff valve 17 is opened and the first shutoff valves 10 are closed to discharge the exhaust gas via the blower 4 and the baghouse 3.

The ducts are suitably provided with a refractory lining and/or water-cooling means. Although the present embodiment includes two preheating units 5, three or more preheating units are usable. In any arrangement, the preheating units 5 are connected together in series by the supply ducts 8, connecting ducts 15 and discharge ducts 11 and provided with the shutoff valves 10, 14, 16, which are opened or closed as specified to pass the exhaust gas through the units 5 in series in succession in an order selectively determined.

With reference to FIGS. 2 to 5, the preheating unit 5 comprises a stationary container 20 in the form of a vertical, hollow cylinder having an upper opening and installed in a fixed position on a floor 19; a movable container 24 serving to accommodate a charge material therein, having a charge inlet 21 at its upper portion and a bottom outlet 23 with an openable bottom closure 22 and vertically movable into or out of the stationary container 20; and a top closure 25 horizontally movable to open or close the inlet 21 of the movable container 24.

Figure 5:
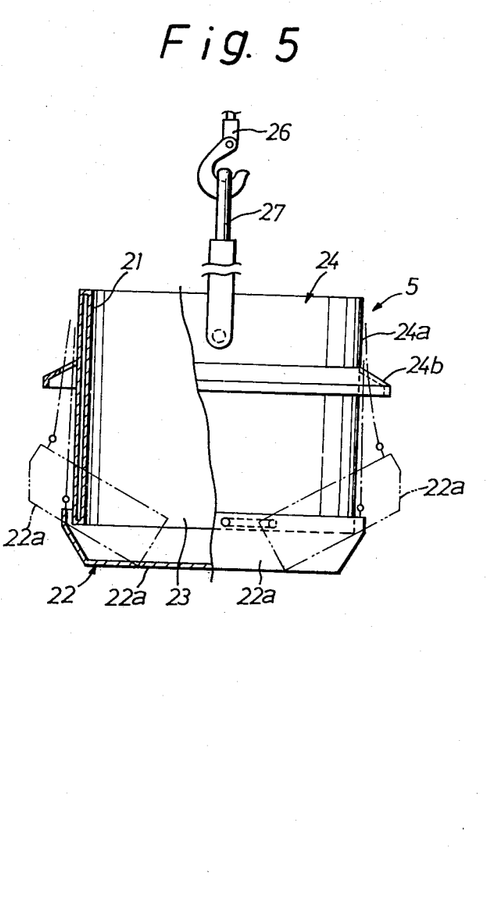
FIG. 5 is an enlarged view partly in section and showing a preheating unit.

As best seen in FIG. 5, the movable container 24 includes a hollow cylindrical main body 24a having a vertical axis for containing the charge therein. The main body 24a has an annular closure 24b projecting from its outer periphery for closing an annular opening between the containers 20 and 24 when the movable container 24 is placed into the stationary container 20. The bottom closure 22 is in the form of a circular dish comprising a pair of divided segments 22a and 22a each of which is semicircular when seen in a plan view. The charge is accommodated and retained in the main body 24a when the bottom closure 22 is in its closed position. When the bottom closure 22 is opened as indicated in broken lines in FIG. 5, the charge is discharged. The main body 24a has a hook 27 pivoted thereto and engageable by a crane 26, by which the main body 24a is movable with the bottom closure 22. The top closure 25 is in the form of a hollow truncated cone and has a large-diameter lower portion which is removably fittable to the main body 24a with a seal member provided therebetween.

The supply duct 8 comprises a fixed duct segment 8b extending from the equipment 2 and having a duct end 8a with a horizontal axis, and a movable duct segment 8c connectable to the fixed segment 8b. The movable segment 8c has a downwardly extending end which is fitted in the small-diameter upper portion of the top closure 25, namely the gas inlet portion 7. The top closure 25 is vertically slidably connected to the movable segment 8c with a seal member provided therebetween. A tubular connector 28 is fitted around one of the duct end 8a of the fixed segment 8b and the horizontal end of the movable segment 8c and is slidable axially thereof by cylinders 29. When slidingly moved, the connector 28 is fittable to the other end to connect the two duct segments 8b and 8c together.

The stationary container 20 has connected to lower portions thereof the connecting duct 15 and the discharge duct 11 which are opposed to each other diametrically of the container. As shown by solid-line arrows in FIG. 2, the exhaust gas flows from the supply duct 8 into the body 24a through the top closure 25, passes through the charge (not shown) in the main body 24a, flows through the clearance between the main body 24a and the bottom closure 22 and is discharged through the connecting duct 15 or the discharge duct 11.

Figures 2, 4:
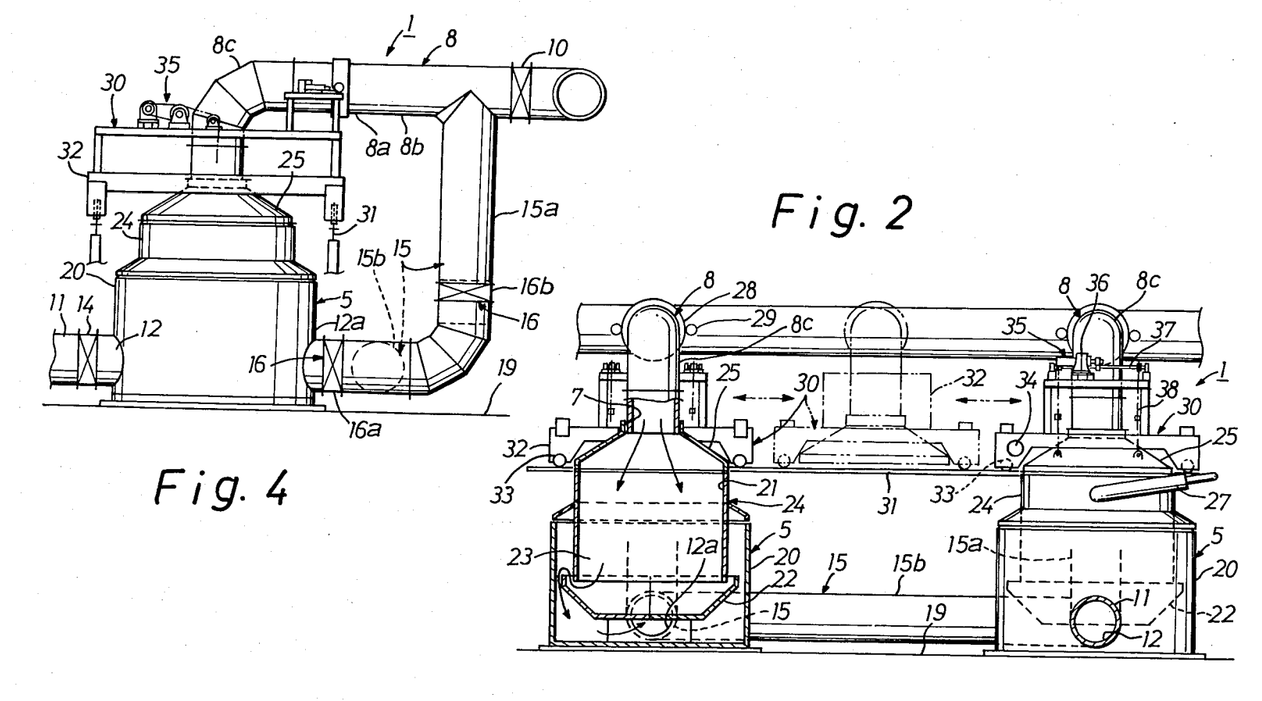
FIG. 2 is a front view partly in section and showing the embodiment as it is seen in the direction of the arrows II, II in FIG. 1.
FIG. 4 is a side elevation of FIG. 2.
Figure 3:
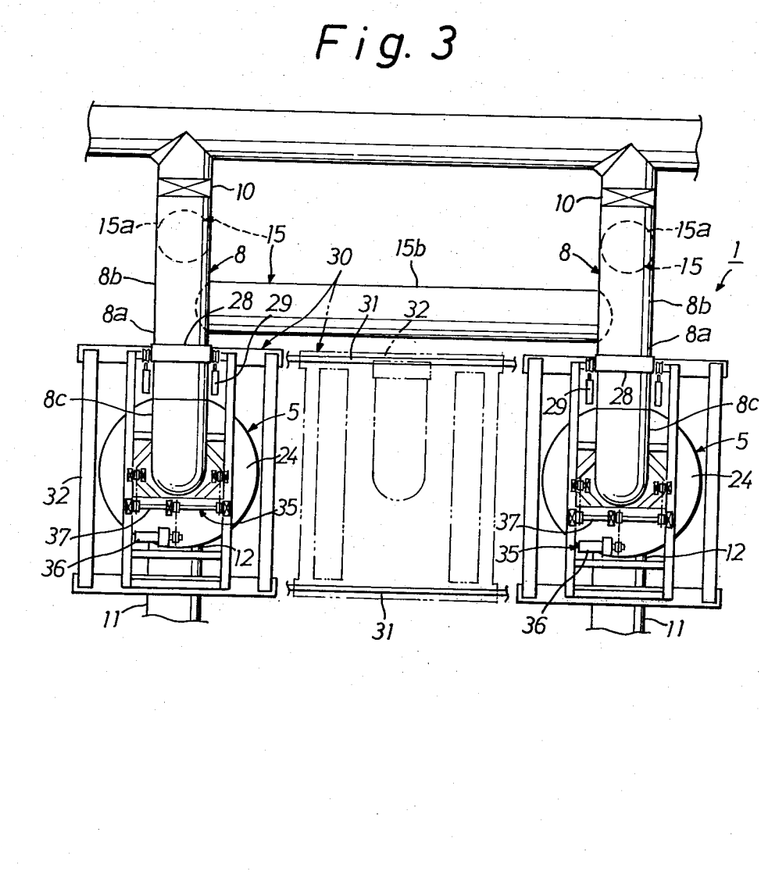
FIG. 3 is a plan view of FIG. 2.

Transfer means 30 comprises a pair of horizontal rails 31 extending on the opposite sides of the adjacent preheating units 5, 5 with the units provided therebetween, and a carriage 32 of the self-propelled type movable on the horizontal rails 31. The carriage 32 has wheels 33 rollable on the rails 31 and an electric motor 34 for driving the wheels 33.

The movable duct segment 8c is fixed to the carriage 32 and made movable horizontally along the rails 31. The top closure 25 is made vertically movable by a lifting unit 35 mounted on the carriage 32. Thus the movable duct segment 24 and the top closure 25 are movable by the transfer means 30 to a position where they permit the movable container 24 to move vertically into or out of the stationary container 20. Moreover the carriages 32 provided for the units 5 individually are alternately movable on the rails 31 to a location between the units 5 (i.e. to the broken-line position shown in FIGS. 2 and 3).

In the illustrated embodiment, the connector 28 is fitted to the movable duct segment 8c, and the cylinders 29 for moving the connector 28 are mounted on a frame on the carriage 32. The lifting unit 35 chiefly comprises an electric motor 36 mounted on the carriage 32, a winch barrel 37 rotatable by the motor 36 through a chain, and chains or cables 38 wound on the barrel 37 and connected to the top closure 25.

The movable container 24, when removed from the stationary container 20, is disconnected from the supply duct 8, connecting duct 15 and discharge duct 11. Conversely when the movable container 24 is placed into the stationary container 20 and the top closure 25 attached to the container 24, the movable container 24 is brought into communication with the ducts 8, 11 and 15. The components of one unit 5 are identical in shape and size with the corresponding components of the other unit 5. Thus the movable container 24 for one unit can be changed for the container 24 for the other unit.

The preheating apparatus of the foregoing construction will be operated in the following manner.

A material, such as scrap, is placed by a dump truck or magnetic crane into the movable container 24 removed from the stationary container 20 by the crane 26. The movable container 24 is then placed into the stationary container 20. The carriage 32 which is previously horizontally moved away from the unit 5 is returned to above the movable container 24, the top closure 25 is lowered by the lifting unit 35 to close the inlet 21, and the supply duct 8 is connected to the container 24. At the same time, the connector 28 is slidingly moved and fitted to the fixed duct segment 8b to connect the movable duct segment 8c to the segment 8b.

In this way, the movable containers 24 each containing the charge are placed in the corresponding stationary containers 20, and the ducts 8, 11 and 15 are brought into communication with the movable containers 24. Subsequently the first to third shutoff valves 10, 14 and 16 are operated, whereby the exhaust gas from the equipment 2 is passed through the unit A and unit B in series and discharged from the baghouse 3 as seen in FIG. 1. In this case, the unit A is preheated with gas having a higher temperature than the gas for heating the unit B. When the charge in the unit A has been completely preheated, the top closure 25 of the unit A is moved away therefrom along with the movable duct segment 8c by the transfer means 30, the movable container 24 is transferred to above the equipment 2, and the bottom closure 22 is opened to place the preheated charge into the equipment 2. In the meantime, another movable container 24 having a charge placed therein is brought into the stationary container 20 of the unit A in communication with the ducts 8, 11 and 15.

The first to third shutoff valves 10, 14 and 16 are then operated to pass the exhaust gas through the unit B and then through the unit A in series in an order reverse to the above.

In this case, the charge in the unit B, which has been preheated to some extent, can be fully preheated within a short period of time. Furthermore, the sensible heat of the exhaust gas passing through the unit B is fully given to the unit A, whereby heat is effectively recovered from the exhaust gas. Since the movable container 24 filled with a fresh charge for preheating can be installed into the stationary container 20 with the same timing as the placement of the preheated charge from the preceding movable container 24 into the steel making equipment 2, the waiting time involved in the process can be shortened to obtain a sufficient period of time for preheating and achieve a high operation efficiency.

As the exhaust gas flows, the temperature of the gas lowers, for example, to about 100° C., while the charge in the preheating unit 5 at a downstream location has a low temperature, so that the temperature of the gas at this location drops to below the dew point, permitting oil mist and other aqueous components of the gas to undergo condensation on the surface of the charge of low temperature, whereby pollutants, such as oil mist, which are likely to cause secondary pollution are collected from the gas. When the charge is preheated in the next stage, the collected oil mist and the like are decomposed on oxidation by exhaust gas having a high temperature, for example, of about 750° C. Thus the release of pollutants to the atmosphere is generally reduced.

Figure 6:
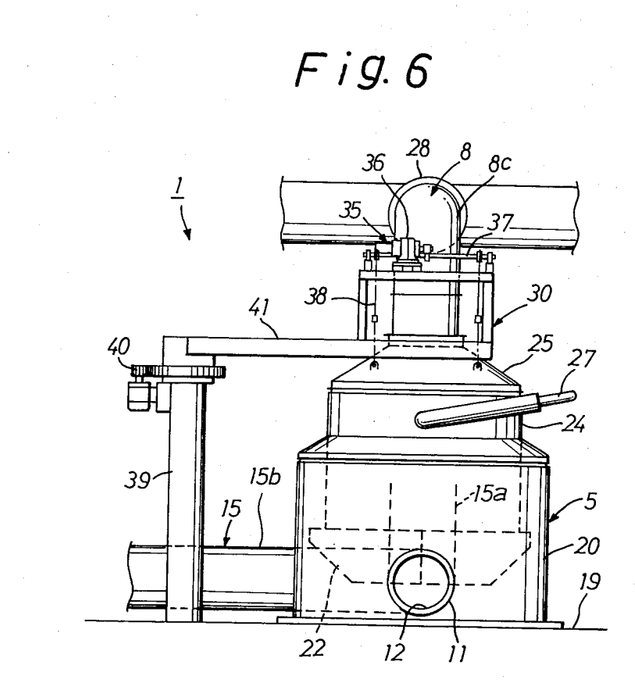
FIG. 6 is a front view showing a modified transfer means.
Figure 7:
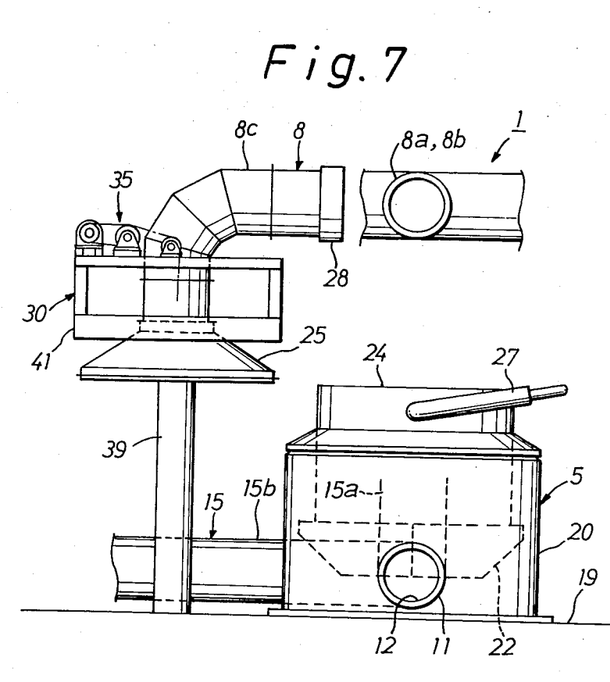
FIG. 7 is a front view of the transfer means for illustrating the operation thereof.

FIGS. 6 and 7 show a modified transfer means 30. A post 39 extending from the floor 19 is provided at its top with a swivel member 41 which is turnable about a vertical axis by a gear assembly 40. As is the case with the foregoing embodiment, the swivel member 41 is fixedly provided with the movable duct segment 8c and has a lifting unit 35 for vertically moving the top closure 25. The movable duct segment 8c and the top closure 25 are movable along a circular arc path toward the fixed segment 8b and movable container 24, are connectable thereto respectively (FIG. 6) and are movable away therefrom along the path (FIG. 7).

Figure 8:
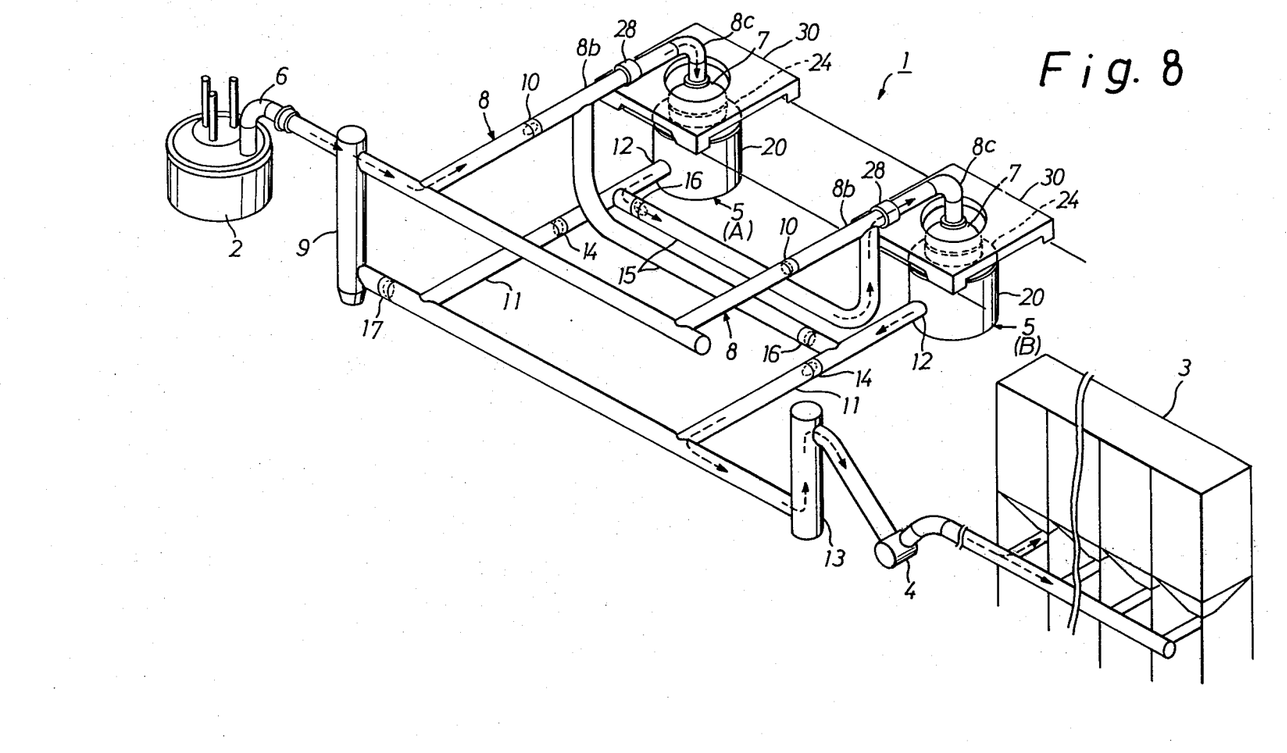
FIG. 8 is an overall perspective view showing another embodiment of the invention.

FIG. 8 shows another embodiment comprising preheating units 5 each having a single gas outlet portion 12, and connecting ducts 15 by each of which a discharge duct 11 extending from the gas outlet portion 12 of each unit 5 to a third shutoff valve 14 is connected to a supply duct 8 extending from a gas inlet portion 7 of the other unit 5 to a first shutoff valve 10. The connecting duct 15 has a second shutoff valve 16. The discharge ducts 11 are directly connected to a lower portion of a gas distribution tower 9 by way of a fourth shutoff valve 17, which is usually closed. By operating the shutoff valves 10, 14 and 16, exhaust gas is passed through the preheating units 5 in series, for example, as indicated by broken-line arrows in FIG. 8. With the exception of the above arrangement, this embodiment is substantially similar to the foregoing embodiment in construction and operation.

The embodiment of FIG. 8 involves the following temperature distribution and gas flow rate distribution during preheating, which are shown for illustrative purposes. The unit A is used upstream from the unit B

| Measuring location | Temperature (°C.) | Gas flow rate (Nm³/min) |
|---|---|---|
| Gas distribution tower | 800 | 900 |
| Supply duct | 750 | 1000 |
| Gas outlet portion of Unit A | 350 | — |
| Gas inlet portion of Unit B | 300 | 1200 |
| Gas outlet portion of Unit B | 100 | 1400 |

The gas flow rate increases progressively downstream due to ingress of air into the duct line from outside.

The present invention described above has the following advantages over the prior art. Used for comparison were a system including a conventional preheating unit according to the prior art (referred to as "PA") and a system including two preheating units in series according to the invention (referred to as "IN").

1. Efficiency (1) Sensible heat of exhaust gas supplied to preheating unit

PA:
$$q_i = \frac{1000 \text{ Nm}^3/\text{min} \times 750° \text{C.} \times 0.34 \text{ kcal/Nm}^3 \cdot °\text{C.} \times 50 \text{ min}}{860 \times 100 \text{ charge ton}}$$

$$= 148 \text{ kwh/charge ton}$$

IN: $q_i = \frac{1000 \times 750 \times 0.34 \times 50}{860 \times 100}$ $$= 148 \text{ kwh/charge ton}$$

(2) Sensible heat of exhaust gas from preheating unit

PA: $q_o = \frac{1200 \times 350 \times 0.34 \times 50}{860 \times 100}$ $$= 83 \text{ kwh/charge ton}$$

IN: $q_o = \frac{1400 \times 100 \times 0.34 \times 50}{860 \times 100}$ $$\approx 28 \text{ kwh/charge ton}$$

Difference ((1)−(2), i.e. heat absorbed by charge)

PA: $q_i - q_o = 148 - 83 = 65$ kwh/charge ton

IN: $q_i - q_o = 148 - 28 = 120$ kwh/charge ton (3) Reduction in power ($\Delta E$)

(Heat efficiency of S/P system $\eta_H \approx 80\%$)

PA: $\Delta E_1 = 65 \times 0.8 = 52$ kwh/charge ton = 58 kwh/ingot ton

IN: $\Delta E_2 = 120 \times 0.8 = 96$ kwh/charge ton ≈ 107 kwh/ingot ton $\Delta E_2 - \Delta E_1 = 49$ kwh/ingot ton (a further power reduction)

(4) Pressure loss ($\Delta P$) in preheating unit

PA: $\Delta P_1 \approx 200$ mm Aq

IN: $\Delta P_2 \approx 400$ mm Aq (5) Capacity of booster blower motor for compensating for pressure loss in preheating unit PA: $L_{F1} = \frac{1600 \times \frac{473}{273} \times 250}{6120 \times 0.5} = 226$ kw IN: $L_{F2} = \frac{1600 \times 1.73 \times 500}{6120 \times 0.5} = 452$ kw $L_{F2} - L_{F1} = 226$ kw (6) Power increase due to motor
PA: 2.1 kwh/ingot ton
IN: 4.2 kwh/ingot ton 2. Overall advantages (1) Reduction in power PA: 58 kwh/ingot ton (when scrap of good quality is used) For usual scrap, gas supply is limited for prevention of secondary pollution. Power reduction then achieved is about 40 kwh/ingot ton.

¥15/kwh×40 kwh=¥600/ingot ton

IN: About 100 kwh/ingot ton (variable depending on furnace operation conditions)

¥15/kwh×100 kwh=¥1500/ingot ton (2) Reduction in electrode consumption
PA: About 0.4 kg/ingot ton ¥600/kg×0.4=¥240/ingot ton IN: About 1 kg/ingot ton ¥600/kg×1=¥600/ingot ton (3) Reduction in oxygen
PA: 2 Nm$^3$/ingot ton ¥45/Nm$^3$×2=¥90/ingot ton IN: 4.5 Nm$^2$/ingot ton ¥45/Nm$^3$ 3 4.5=¥202/ingot ton (4) Reduction in oil
PA: 0.5 l/ingot ton ¥65/1×0.5=¥32/ingot ton IN: 1.25 l/ingot ton ¥65/1×1.25=¥81/ingot ton (5) Reduction in refractory consumption
PA: 0.6 kg/ingot ton ¥150/kg×0.6=¥90/ingot ton IN: 1.6 kg/ingot ton ¥150/kg×1.6=¥240/ingot ton Total energy and material cost reduction
PA: ¥1052/ingot ton
IN: ¥2623/ingot ton
(6) Reduction in steel making time
PA: About 7 minutes
IN: About 13 minutes
(7) Improvement in production efficiency by preheating (Without preheating 17 heats/day, tap to tap 85 min)
PA: Tap to tap 78 min, 18.5 heats/day Annual output = 18.5 h/day × 90 t/heat × 350 w.d/year = 583,000 tons/furnace IN: Tap to tap 72 min, 20 heats/day Annual output = 20 × 90 × 350

= 630,000 tons/furnace

Increase (IN−PA): 4,700 tons/year (8) Annual cost reduction (for energy and consumption materials only)

PA: ¥1052/t × 583,000 t/year

About 600 million yen/year (The equipment cost is refundable within 6 months.)

IN: ¥2623/t × 630,000 t/year

About 1,640 million yen/year (refundable within 4 months)

(9) Measures for preventing secondary pollution (white smoke, odor)

PA: (1) NAPEC (control of gas flow by microcomputer)

(2) Combustion of unburnt gas by after burning

IN: (1) Since two preheating units are operated in series with alternately reversed gas flow, the gas has reduced temperature of about 100° C. when eventually released to air, hence no secondary pollution.

(2) NAPEC when desired

What is claimed is:

1. An apparatus for preheating a charge for steel making furnace with the heat of exhaust gas from the furnace, comprising a plurality of independent preheating units each including a stationary container having a upper opening and installed in a fixed position, a movable container serving to accommodate the charge therein, having a charge inlet at its upper portion and a bottom outlet with an openable bottom closure and vertically movable into or out of the stationary container, and a top closure provided with transfer means and horizontally movable to open and close the charge inlet of the movable container; at least one supply duct for connecting an exhaust gas discharge portion of the furnace to a gas inlet portion of each preheating unit; at least one discharge duct provided for each preheating unit for eventually discharging the exhaust gas passing through the preheating units; and connecting ducts each connecting a gas outlet portion of each preheating unit to the gas inlet portion of another preheating unit adjacent thereto so that the exhaust gas passes through the plurality of independent preheating units in succession in series.

2. A preheating apparatus as defined in claim 1 wherein the exhaust gas discharge portion is connected to the gas inlet portions of the preheating units by supply ducts each having a first shutoff valve, the connecting ducts each having a second shutoff valve and interconnecting the preheating units, discharge ducts each having a third shutoff valve and each connected to the gas outlet portion of the corresponding preheating unit, the shutoff valves being openable or closable to pass the exhaust gas through the preheating units in succession in series in an order selectively determined.

3. A preheating apparatus as defined in claim 1 or 2 wherein each of the preheating units has a charge accommodating portion detachably connectable to the supply duct, the connecting ducts and the discharge duct and interchangeable with the corresponding portion of another preheating unit.

4. A preheating apparatus as defined in claim 1 wherein the supply duct is connected to the top closure of each preheating unit, and the stationary container of each preheating unit is connected to the connecting duct and the discharge duct for receiving the exhaust gas supplied by the supply duct and passing through the movable container.

5. A preheating apparatus as defined in claim 4 wherein the supply duct comprises a fixed duct segment and a movable duct segment separate from but connectable to the fixed duct segment, the movable duct segment being fixed to horizontally movable transfer means, the top closure being connected to the movable duct segment vertically movably and supported by the transfer means vertically movably, the movable duct segment and the top closure being movable by the transfer means to a position to permit the movable container to move into or out of the stationary container.

6. A preheating apparatus as defined in claim 5 wherein a tubular connector is axially slidably fitted around one of the stationary duct segment and the movable duct segment, and the connector is slidingly fittable to the other duct segment to connect the duct segments together.

7. A preheating apparatus as defined in claim 1 wherein the transfer means comprises a wheeled carriage movable on horizontal rails.

8. A preheating apparatus as defined in claim 7 wherein the horizontal rails extend from one of the preheating units to another preheating unit adjacent thereto, and wheeled carriages provided for these units are alternately movable on the rails between the units.

9. A preheating apparatus as defined in claim 1 wherein the transfer means comprises a swivel member turnable about a vertical axis.

* * * * *